3,556,733
FINES DISSOLVER FOR CRYSTALLIZERS
Robert Howard Hedrick, Warren, Pa., assignor to Struthers Scientific and International Corporation, a corporation of Delaware
Filed Apr. 5, 1968, Ser. No. 719,112
Int. Cl. B01d 9/02
U.S. Cl. 23—273     2 Claims

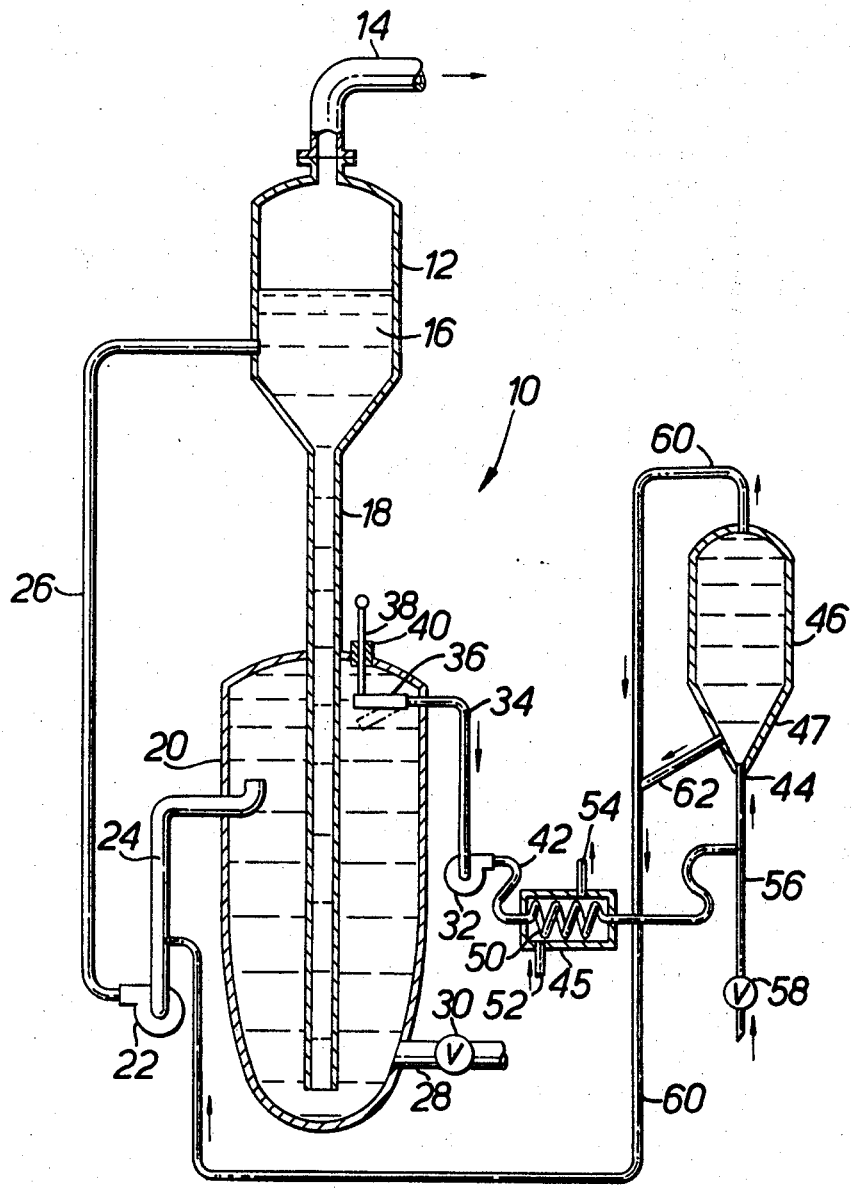

ABSTRACT OF THE DISCLOSURE

A dissolver for fine crystals in a slurry has a second hydraulically balanced exit flow positioned to draw off larger crystals and prevent crystal buildup and resulting plugging of the dissolver.

BACKGROUND OF THE INVENTION

In vacuum evaporator crystallizers having a lower suspension chamber and an upper evaporating chamber, it is desirable to reduce the number of fine crystals or nuclei so that supersaturation will only be released to contribute to the growth of larger crystals. Generally, larger crystals are more desired as a product. As well as the conventional first recirculating loop, a second recirculating loop is provided to draw off fine crystals from the suspension chamber, dissolve them, and return them to the vacuum evaporation chamber. In the second recirculating loop, the fine crystals are dissolved in a fines dissolver which has a reduced upward flow therein to suspend and not carry upward the fine crystals as they are dissolved. Dissolving is accomplished by adding a solvent, generally water, adding heat, the solution containing the crystals, or by any other suitable means. If a suitable balance of conditions is not exactly maintained in the fines dissolver, crystals will grow and settle therein to cause a costly stoppage requiring the shutting down of the entire crystallizer. If too much solvent or heat is added, the efficiency of the crystallizer falls.

SUMMARY OF THE INVENTION

In a crystallizer having a second fine crystal dissolving recirculating loop with a fines dissolver in the second recirculating loop, said fines dissolver having upward flow therein and having a flaring or outwardly tapering lower portion, the lower portion reducing the upward flow rate therein so that fine crystals may be suspended as they dissolve, the improvement comprising a lower outlet from an intermediate location in the lower portion of the fines dissolver, said lower outlet being hydraulically balanced to receive more than 5 and less than 20 percent of the total flow into the fines dissolver, said lower outlet carrying off any larger crystals settling in said dissolver.

BRIEF DESCRIPTION OF THE DRAWING

The figure is a vertical section through a vacuum evaporator crystallizer and a fines dissolver connected thereto according to this invention.

DESCRIPTION OF THE PREFERRED EMBODIMENT

A crystallizer, generally designated by the reference numeral 10, has an upper evaporation chamber 12 connected to a vacuum line 14 to evaporate and cool a solution 16 therein to provide some degree of supersaturation. The supersaturated solution passes downward in duct 18 to enter the bottom of suspension chamber 20 where the supersaturation is relieved by providing crystal growth. Pump 22 draws solution through pipe 24 from an upper central portion of chamber 20 to recirculate a slurry of crystals of a desired size through pipe 26 to evaporation chamber 12. Pipes 24 and 26 and pump 22 form a first slurry recirculating loop. Larger crystals, as they grow, sink downward against the upward flow of solution in chamber 20 to be withdrawn as a product through pipe 28 when valve 30 is opened.

Pump 32 draws solution through pipe 34 from the upper portion of suspension chamber 20. A rubber tube extension 36 on the end of pipe 34 may have its free end raised and lowered to be positioned by a control rod 38 which passes through the fluid-tight packing 40. Control rod 38 enables tube 36 to be exactly positioned to draw off the layer of the finest nuclei in chamber 20. It is desirable to draw off fine crystals or nuclei so that supersaturation may be relieved more efficiently by providing for the growth of larger crystals.

Pump 32 passes the slurry of fine crystals through pipe 42 to pipe 44 which enters the bottom of fines dissolver 46. Fines dissolver 46 has an outwardly tapering lower end 47 which progressively reduces the upward flow velocity therein. Depending on the solution, either heat may be added by means of jacket 48, coil 50, and the hot water inlet and outlet pipes 52 and 54, or water or other solvent may be added in small quantities through pipe 56 and valve 58, to reduce the solution of fines below its saturation point and enable the fines to be dissolved. Clear solution of dissolved fines is withdrawn through pipe 60 to re-enter the system through the first recirculating loop. Pipes 34, 42, and 60, pump 32, and fines dissolver 46 all form a second recirculating loop.

With the exception of the variable inlet of the second recirculating loop formed by the rubber tube 36 and its attached control rod, all the foregoing apparatus is known. This apparatus is conventionally used to crystallize a wide variety of salts, generally from aqueous solutions. One example of such a salt which could be so crystallized would be the selective crystallization of KCl from a solution of NaCl and KCl in water. In this example, small amounts of water would be added to the fines dissolver 46 through pipe 56 to dissolve small crystals therein.

This invention consists of the addition of pipe 62. Without pipe 62, if the balance of conditions shifts so that all fines are not dissolved, only the smallest and least desired crystals will be carried to the top of fines dissolver 46 to be recirculated. Further, crystals will grow in fine dissolver 46 to settle downward in it and eventually plug it up requiring a costly shutdown and cleaning operation. Pipe 62 is sized in relation to fines dissolver 46 and pipe 60 to have a pressure drop therein to receive about 10 percent of the flow entering fines dissolver 46. This 10 percent flow through pipe 62 provides for maximum effectiveness. However, this flow through pipe 62 may vary between 5 and 20 percent and still be effective. Pipe 62 draws flow from the central portion of the outwardly tapering bottom 47 of fines dissolver 46 where heavier crystals are suspended by the relatively higher flow velocity in this area compared to the upper portion of tank 46. These heavier or larger crystals are thus drawn off and recirculated as they are formed. Thus, the second recirculation loop according to this invention recirculates desired larger crystals for further growth and ensures that only a clear liquid is withdrawn from the top of fines dissolver 46. Further, the improvement comprising this invention absolutely prevents any costly shutdown of the apparatus to unplug the fines dissolver 46 and it enables crystallizer 10 to be operated at maximum efficiency. The considerable advantages of this invention are accomplished without any elaborate controls and they are accomplished for a minimum cost.

While this invention has been shown and described in the best form known, it will nevertheless be understood that this is purely exemplary and that modifications may be made without departing from the spirit and scope of the invention except as it may be more limited in the apended claims.

What is claimed is:

1. In a crystallizer having an upper chamber, a lower suspension chamber, a central duct conducting fluid from said upper chamber to the bottom of said suspension chamber, a first recirculating loop having an inlet drawing solution from said suspension chamber, said first recirculating loop introducing the solution into said upper chamber to produce supersaturation therein to be relieved, growing crystals in said lower suspension chamber, means withdrawing large crystals as a product from the bottom of said suspension chamber, and a second recirculating loop having an inlet drawing solution from said suspension chamber above the inlet to said first recirculating loop, a fines dissolver through which solution is passed upwards, said fines dissolver having an outwardly tapering bottom portion, means conducting solution from the top of said fines dissolver to flow into said upper chamber, and means reducing the supersaturation of solution entering said fines dissolver below the saturation point, the improvement comprising, in combination, a pipe conducting between about 5 and 20 percent of the flow into said fines dissolver from a central portion of said outwardly tapering bottom of said fines dissolver to flow into said means conducting fluid from the top of said fines dissolver.

2. The combination according to claim 1 wherein said pipe conducts about 10 percent of the fluid entering said fines dissolver from said fines dissolver.

References Cited

UNITED STATES PATENTS 2,219,776   10/1940   Henderson   23—273
2,819,154   1/1958    Frejacques  23—273

NORMAN YUDKOFF, Primary Examiner

S. SILVERBERG, Assistant Examiner

U.S. Cl. X.R.

159—45